United States Patent
Payne et al.

(10) Patent No.: US 8,458,147 B2
(45) Date of Patent: Jun. 4, 2013

(54) TECHNIQUES FOR THE ASSOCIATION, CUSTOMIZATION AND AUTOMATION OF CONTENT FROM MULTIPLE SOURCES ON A SINGLE DISPLAY

(75) Inventors: Michael J. Payne, Beaverton, OR (US); Brian David Johnson, Portland, OR (US); Cory J. Booth, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 576 days.

(21) Appl. No.: 12/229,145

(22) Filed: Aug. 20, 2008

(65) Prior Publication Data

US 2010/0049719 A1 Feb. 25, 2010

(51) Int. Cl.
*G06F 7/00* (2006.01)
*G06F 17/00* (2006.01)

(52) U.S. Cl.
USPC ........... 707/694; 707/802; 707/805; 715/209; 715/714; 715/719; 715/744

(58) Field of Classification Search
USPC ............... 707/999.1, 802, 694, 805; 715/209, 715/714, 744, 719
See application file for complete search history.

(56) References Cited

U.S. PATENT DOCUMENTS

| | | | | |
|---|---|---|---|---|
| 5,990,883 A * | 11/1999 | Byrne et al. | | 715/721 |
| 6,072,442 A * | 6/2000 | Stirling | | 345/1.1 |
| 6,173,296 B1 * | 1/2001 | Perlman et al. | | 715/203 |
| 6,353,450 B1 * | 3/2002 | DeLeeuw | | 715/768 |
| 6,522,342 B1 * | 2/2003 | Gagnon et al. | | 715/716 |
| 6,570,585 B1 * | 5/2003 | Hines et al. | | 715/716 |
| 6,577,350 B1 * | 6/2003 | Proehl et al. | | 348/564 |
| 6,580,437 B1 * | 6/2003 | Liou et al. | | 715/719 |
| 6,590,585 B1 * | 7/2003 | Suzuki et al. | | 715/719 |
| 6,633,309 B2 * | 10/2003 | Lau et al. | | 715/723 |
| 6,636,237 B1 * | 10/2003 | Murray et al. | | 715/719 |
| 7,206,434 B2 * | 4/2007 | Overton et al. | | 382/103 |

(Continued)

FOREIGN PATENT DOCUMENTS

| EP | 1111926 | 6/2001 |
|---|---|---|
| EP | 1111926 A2 | 6/2001 |

(Continued)

OTHER PUBLICATIONS

Chorianopoulos, Konstantinos, et al., "Coping with TiVo: Opportunities of the networked digital video recorder", Telematics and Informatics, vol. 24, Issue 1, Feb. 2007, pp. 48-58.*

(Continued)

*Primary Examiner* — Phong Nguyen
(74) *Attorney, Agent, or Firm* — Trop, Pruner & Hu, P.C.

(57) ABSTRACT

Techniques for the association, customization and automation of content from multiple sources on a single display device are described. A method includes storing an association rule as defined by a user, where the association rule defines a main content source and an associated content source. When the user accesses the main content source, automatically receiving content from the main content source and content from the associated content source as defined by the association rule. Then, causing the display of the associated content overlayed on the main content via a user interface on a display device. Other embodiments are described and claimed.

17 Claims, 7 Drawing Sheets

U.S. PATENT DOCUMENTS

| | | |
|---|---|---|
| 2002/0152462 A1 | 10/2002 | Hoch |
| 2002/0188944 A1* | 12/2002 | Noble .............................. 725/39 |
| 2003/0084449 A1* | 5/2003 | Chane et al. ..................... 725/46 |
| 2003/0226146 A1 | 12/2003 | Thurston et al. |
| 2004/0070620 A1 | 4/2004 | Fujisawa |
| 2004/0220791 A1* | 11/2004 | Lamkin et al. ................... 703/11 |
| 2005/0027659 A1* | 2/2005 | Kumar et al. ................. 705/400 |
| 2006/0026059 A1* | 2/2006 | Grosz ............................. 705/14 |
| 2006/0061580 A1* | 3/2006 | Fujiwara et al. ............. 345/530 |
| 2006/0136295 A1* | 6/2006 | Bobick et al. .................... 705/14 |
| 2006/0143078 A1* | 6/2006 | Pozniansky et al. ............ 705/14 |
| 2007/0033613 A1* | 2/2007 | Ward et al. ...................... 725/42 |
| 2007/0055986 A1* | 3/2007 | Gilley et al. ..................... 725/34 |
| 2007/0154190 A1* | 7/2007 | Gilley et al. ................... 386/125 |
| 2008/0043157 A1* | 2/2008 | Jones ............................ 348/744 |
| 2008/0052742 A1* | 2/2008 | Kopf et al. ....................... 725/34 |
| 2008/0059300 A1* | 3/2008 | Hamoui ........................... 705/14 |
| 2008/0172709 A1 | 7/2008 | Rhu |
| 2008/0187279 A1* | 8/2008 | Gilley et al. ..................... 386/52 |
| 2008/0195621 A1* | 8/2008 | Tedesco et al. ................... 707/9 |
| 2008/0201736 A1* | 8/2008 | Gordon et al. ................... 725/34 |
| 2008/0212942 A1* | 9/2008 | Gordon et al. ................. 386/124 |
| 2008/0235731 A1* | 9/2008 | Bryant et al. .................... 725/44 |
| 2008/0244470 A1* | 10/2008 | Nowlan et al. ................ 715/866 |
| 2008/0262913 A1* | 10/2008 | Reitz et al. ....................... 705/14 |
| 2009/0006375 A1* | 1/2009 | Lax et al. ........................... 707/5 |
| 2009/0019061 A1* | 1/2009 | Scannell, Jr. .................... 707/10 |
| 2009/0047000 A1* | 2/2009 | Walikis et al. ................ 386/124 |
| 2009/0051761 A1* | 2/2009 | Atarashi .......................... 348/54 |
| 2009/0060256 A1* | 3/2009 | White et al. ................... 382/100 |
| 2009/0094096 A1* | 4/2009 | Riise et al. ....................... 705/10 |
| 2009/0099671 A1* | 4/2009 | Harris ............................. 700/94 |
| 2009/0133067 A1* | 5/2009 | Sherman et al. ................ 725/43 |
| 2009/0144801 A1* | 6/2009 | Grouf et al. ........................ 726/1 |
| 2009/0172723 A1* | 7/2009 | Shkedi et al. ................... 725/32 |
| 2009/0172727 A1* | 7/2009 | Baluja et al. .................... 725/34 |
| 2009/0172746 A1* | 7/2009 | Aldrey et al. ................... 725/61 |
| 2009/0187825 A1* | 7/2009 | Sandquist et al. ............ 715/719 |
| 2009/0199099 A1* | 8/2009 | Girgensohn et al. .......... 715/719 |
| 2009/0204989 A1* | 8/2009 | White et al. ..................... 725/37 |
| 2009/0217320 A1* | 8/2009 | Aldrey ............................. 725/37 |
| 2009/0267867 A1* | 10/2009 | Gonia ............................. 345/1.1 |
| 2009/0313664 A1* | 12/2009 | Patil et al. ........................ 725/87 |
| 2009/0317050 A1 | 12/2009 | Son et al. |
| 2009/0320060 A1* | 12/2009 | Barrett ............................ 725/32 |
| 2009/0327893 A1* | 12/2009 | Terry et al. ..................... 715/719 |
| 2010/0011296 A1* | 1/2010 | Rose .............................. 715/720 |
| 2010/0023893 A1* | 1/2010 | Shan et al. ..................... 715/838 |
| 2010/0050082 A1* | 2/2010 | Katz et al. ..................... 715/719 |
| 2010/0141833 A1* | 6/2010 | Lemmers ...................... 348/468 |
| 2010/0328496 A1* | 12/2010 | Pozniansky et al. ..... 348/231.99 |

FOREIGN PATENT DOCUMENTS

| | | |
|---|---|---|
| KR | 10-2006-0077961 A | 7/2006 |
| KR | 100791417 B1 | 1/2008 |
| WO | 2004/109467 A2 | 12/2004 |
| WO | 2006091740 | 8/2006 |
| WO | 2007/135750 A1 | 11/2007 |
| WO | 2007135750 | 11/2007 |
| WO | 2010/021834 A2 | 2/2010 |
| WO | 2010/021834 A3 | 5/2010 |

OTHER PUBLICATIONS

Mei, Tao, et al., "VideoSense—Towards Effective Online Video Advertising", MM '07, Augsburg, Bavaria, Germany, Sep. 23-28, 2007, pp. 1075-1084.*

International Search Report and Written Opinion received for PCT Patent Application No. PCT/US2009/052648, mailed on Mar. 15, 2010, 11 pages.

Office Action received for European Patent Application No. 09251957.8, mailed on Jul. 21, 2010, 5 pages.

Office Action received for European Patent Application No. 09251957.8, mailed on Sep. 17, 2009, 1 page.

International Preliminary Report on Patentability received for PCT Patent Application No. PCT/US2009/052648, mailed on Mar. 3, 2011, 6 pages.

Office Action received for European Patent Application No. 09251957.8, mailed on Nov. 25, 2009, 4 pages.

Office Action received for Chinese Patent Application No, 200910170412.9, mailed on Sep. 21, 2011, 3 pages of Chinese office action and 5 pages of English translation.

European Search Report issued in corresponding EP11008692, dated Aug. 10, 2012 (9 pages).

\* cited by examiner

TECHNIQUES FOR THE ASSOCIATION, CUSTOMIZATION AND AUTOMATION OF CONTENT FROM MULTIPLE SOURCES ON A SINGLE DISPLAY

BACKGROUND

Today's homes may have one or more means for receiving content displayed on a single device. For example, various electronic devices in the home may be networked together in such a way to provide a user with a means for entertainment via a connected device and a single display device. Each of these electronic devices typically receives, processes and/or stores content. Example electronic devices may include personal computers (PCs), televisions, digital video disk (DVD) players, video cassette recorder (VCR) players, compact disk (CD) players, set-top boxes (STBs), stereo receivers, audio/video receivers (AVRs), media centers, personal video recorders (PVRs), digital video recorders (DVRs), gaming devices, digital camcorders, digital cameras, blackberries, cellular phones, personal digital assistants (PDAs), and so forth. The networked connected device may also be adapted to receive content from multiple inputs representing Internet Protocol (IP) input connections, person-to-person (P2P) input connections, cable/satellite/broadcast input connections, DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth.

While many of today's homes may have one or more means for receiving content displayed on a single display device as described above, there are limitations for users to control or customize the display of multiple types of content at the same time on the single display device. For example, users today can get Internet content merged with television content via Really Simple Syndication (RSS) feeds. But, these RSS feeds are typically pre-determined by the television stations. Users today also can get Internet content on top of, next to (e.g., picture-in-picture), or in place of television broadcasting or other content (e.g., DVD, personal pictures or video, etc.) on their television. In addition, various radios can be used to pull in different broadcast signals, including digital video broadcast, cell, internet protocol (IP), WiMax, and so forth. Still, there currently lacks the ability for users to control or customize the display of content from multiple sources.

DETAILED DESCRIPTION

Various embodiments of the invention may be generally directed to techniques for the association, customization and automation of content from multiple sources on a single display device. In embodiments, a connected device is adapted to receive multiple inputs supporting different sources of media or content. The multiple inputs may represent various types of connections including wired, wireless, or a combination of both. More specifically, the multiple inputs may represent Internet Protocol (IP) input connections, person-to-person (P2P) input connections, cable/satellite/broadcast input connections, DVB-H and DMB-T transceiver connections, ATSC and cable television tuners, UMTS and WiMAX MBMS/MBS, IPTV through DSL or Ethernet connections, WiMax and Wifi connections, Ethernet connections, inputs from various electronic devices (e.g., televisions, DVD players, VCR players, CD or music players, STBs, stereo receivers, AVRs, media centers, PVRs, DVRs, gaming devices, digital camcorders, digital cameras, blackberries, cellular phones, PDAs, laptops, flash devices, etc.), applications being processed by various electronic devices, and so forth.

In embodiments, the connected device is further adapted to allow a user to determine associations or links between two or more of the different sources of content. Here, a first content source may be determined to be the main content source and a second content source may be determined to be the associated content source. Embodiments of the invention then create and store one or more content association rules as defined by the user. These rules are automatically launched for the user when the user views or accesses content from the main content source without any further interaction from the user. In embodiments, when the user causes the display of content from the main content source, then content from the associated content source is automatically displayed or accessible with the main content on the same display device.

In embodiments, the connected device is adapted to allow the user to customize the display of the main and associated sources of content. For example, in embodiments, the main content source may be displayed in a main content section of the display screen, where the main content section includes the entire screen. The associated content source may be displayed in an associated content section, where the associated content section is overlayed in some way over the main content section on the screen. Embodiments of the invention allow the user to customize the display of the main and associated content sections (e.g., placement on screen, size, volume level of audio associated with content, quality (e.g., opaque or transparent), audio only, visual only, and so forth). Embodiments of the invention are not limited in this context.

Embodiments of the invention also allow for the user to establish or customize display triggers upon defined events. For example, when the main content section starts to display a commercial then enlarge the associated content section on the screen and increase the volume level for its associated audio (and decrease the volume for the main content). Another example may include the main content being the channel or the feed that the user is watching. Then, the associated content may be information that is cross-referenced by time or via a GPS (global positioning system) or some other constant that is able to establish what the user is watching at any given time (e.g., a EPG (electronic programming guide)). This allows the main and associated content to be linked together other types of content. Embodiments of the invention are not limited in this context. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
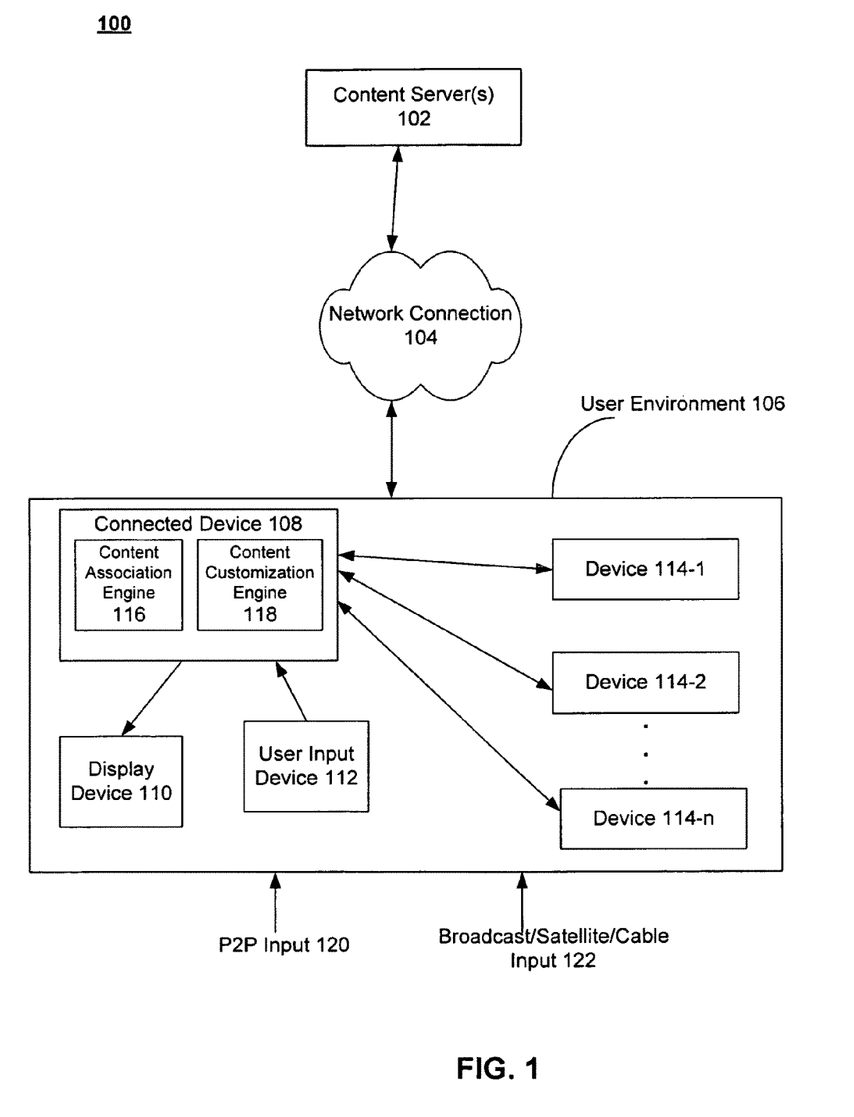
FIG. 1 illustrates one embodiment of a system.

FIG. 1 illustrates an embodiment of a system 100. Referring to FIG. 1, system 100 may comprise content server(s) 102, a network connection 104 and a user environment 106. User environment 106 may include a connected device 108, a display device 110, a user input device 112 and devices 114 (114-1 through 114-*n*, where n is any positive integer). Connected device 108 may include a content association engine 116 and a content customization engine 118. A P2P input 120 and broadcast/satellite/cable inputs 122 are connected to device 108. Possible inputs or connections may also include DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. Each of these elements is described next in more detail.

At a high level and in various embodiments, a content service provider (e.g., a television service provider) may host content server(s) 102. Content server 102 may store, but is not limited to, information about each of it users or subscribers and available content for each of its subscribers to download on demand. In such an embodiment, the distribution of the content is controlled because the content service provider hosts the content server where subscriber information is stored, the content service provider knows which content is included in a particular subscription with the content service provider and knows of subscriber-defined controls (e.g., parental controls) set up by the subscriber. Therefore, the content service provider, prior to allowing requested content to be distributed to the subscriber, can determine whether the subscriber has access rights to the requested content and whether the subscriber-defined controls allow for the content to be viewed. Content servers 102 may also include content that is free to all users.

Content servers 102 may communicate with user environment 106 (as well as other user environments not shown in FIG. 1) via network connection 104. Network connection 104 may be a high speed Internet connection or any other type of connection suited for the particular application. Other types of connections may be added or substituted as new connections are developed.

In embodiments, user environment 106 may include a connected device 108. Connected device 108 may be owned, borrowed or licensed by its respective user. Connected device 108 is connected to network connection 104 and may communicate with servers 102 via its unique IP address, for example.

In embodiments, connected device 108 is adapted to receive multiple inputs supporting different sources of media or content. The multiple inputs may represent various types of connections including wired, wireless, or a combination of both. More specifically, the multiple inputs may represent Internet Protocol (IP) input connections (e.g., network connection 104), a person-to-person (P2P) input connection 120, broadcast/satellite/cable input connections 122, DVB-H and DMB-T transceiver connections, ATSC and cable television tuners, UMTS and WiMAX MBMS/MBS, IPTV through DSL or Ethernet connections, WiMax and Wifi connections, Ethernet connections, and inputs from various electronic devices 114-1 through 114-*n*. Example electronic devices may include, but are not limited to, televisions, DVD players, VCR players, CD or music players, STBs, stereo receivers, AVRs, media centers, PVRs, DVRs, gaming devices, digital camcorders, digital cameras, blackberries, cellular phones, PDAs, laptops, flash devices, and so forth.

In embodiments, the content may be any type of content or data. Examples of content may generally include any data or signals representing information meant for a user, such as media information, voice information, video information, audio information, image information, textual information, numerical information, alphanumeric symbols, graphics, and so forth. The embodiments are not limited in this context.

In embodiments, connected device 108 may represent a device that includes personal video recorder (PVR) functionality. PVR functionality records television data (i.e., requested content) in digital format (e.g., MPEG-1 or MPEG-2 formats) and stores the data in a hard drive or on a server, for example. The data may also be stored in a distributed manner such as on one or more connected devices throughout a home or office environment. In embodiments, a PVR could be used as a container for all things recorded, digital or other (e.g., DVRs).

In embodiments, connected device 108 is further adapted to allow a user to determine associations between two or more of the different sources of content. Here, the user may select a first content source (or main content source) via user input device 112, for example. Content association engine 116 detects and logs the first content source, as selected by the user. The user may then select a second content source (or associated content source). Engine 116 detects and logs the second content source. Embodiments provide for the user to select a third content source, a fourth content source, and so forth, all of which may be associated with the first or main content source or one or more of the associated content sources.

In embodiments, content association engine 116 then establishes rules for the user for the selected content sources. In embodiments, a default rule may be established that the first selected content source is considered to be the main content source and the later selected content source(s) are considered to be the associated content source(s). Embodiments of the invention also allow the user to override any default association rules and explicitly indicate the main and associated content sources.

In embodiments, once the user is identified by connected device 108, his or her established association rules are automatically executed. Here, when the user causes the display of the main content source, the associated content source is automatically displayed or accessible with the main content source on the same display device (e.g., display device 110). For example, assume that content association engine 116 stores multiple association rules for the user. One association rule establishes that the main content source is broadcasted content of a particular show (e.g., the American Idol show) via broadcast/satellite/cable input 122. The association rule also establishes that the associated content source is a live American Idol blogger at an Internet site via network connection 104. Here, when the user tunes to the American Idol show and it is displayed on a display device, pieces of information from the American Idol blogger site are automatically displayed on the same display device as the American Idol show. Embodiments of the invention are not limited in this context.

In other embodiments, when the user causes the display of the main content source on a display device (e.g., television), the associated content source is automatically displayed or accessible at the same time as the main content source on a different display device (e.g., MID). Embodiments of the invention are not limited in this context.

In embodiments, association rule may be further refined by the user to limit the type of information displayed by an associated content source. Using the above American Idol show example, assume that the user established an association rule that indicated that they are only interested in a particular contestant on the American Idol show. Here, the associated American Idol blogger site information may be automatically filtered by connected device 108 to only display information about that particular contestant. Other filters might be used to filter specific scenes, activities, and so forth, in the associated content. Embodiments of the invention are not limited in this context.

In embodiments, an association rule may include multiple associated content sources. Here, the user might customize the association rule to display all of the multiple associated content sources at the same time. The user might also customize the association rule to provide an ordering to the multiple associated content sources by displaying each one for a period of time and then toggling through them one by one. The user might also customize the association rule to skip over any associated content source that is currently not available. Embodiments of the invention are not limited in this context. Example user interfaces will be described next with reference to FIGS. 2 and 3.

Figure 2:
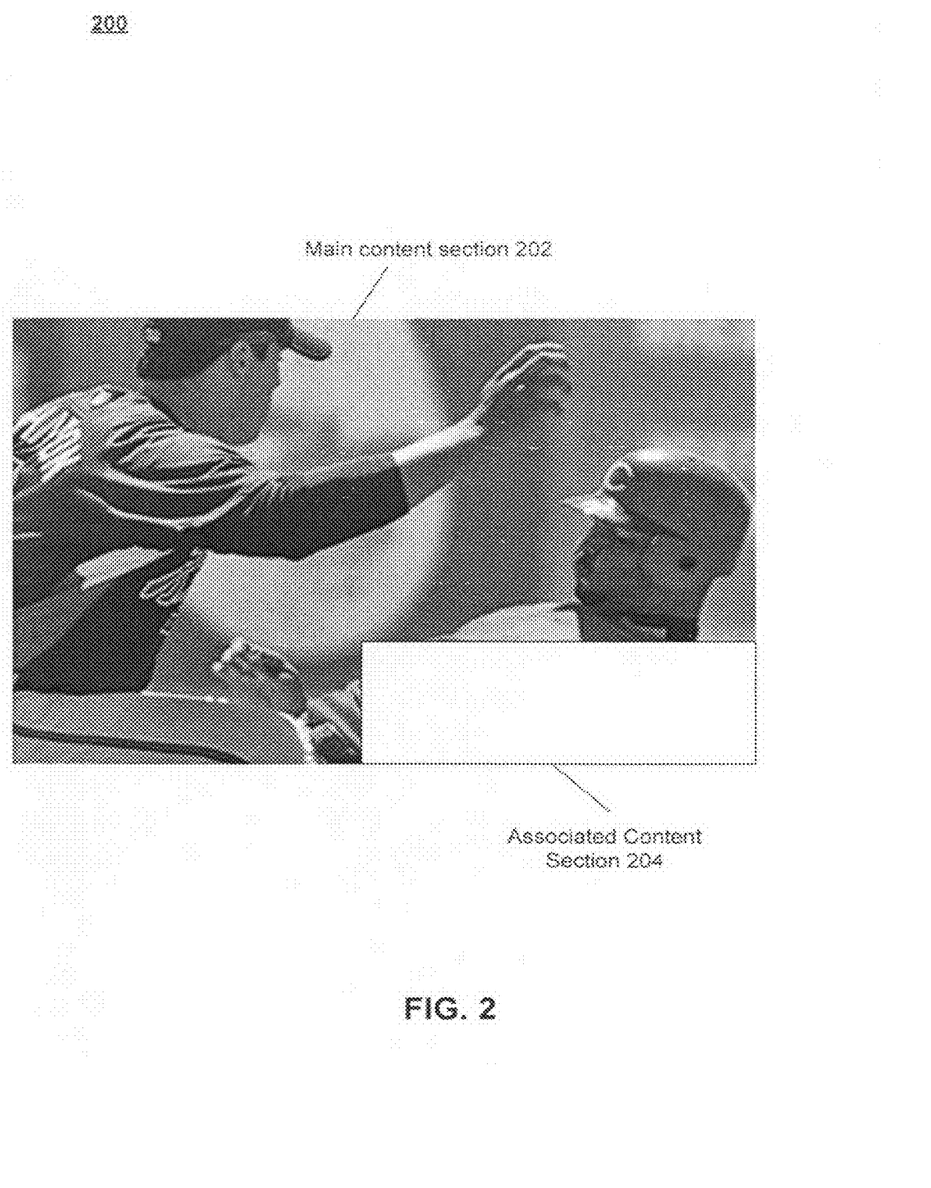
FIG. 2 illustrates one embodiment of a user interface.

Referring to FIG. 2, one embodiment of a user interface 200 is shown. User interface 200 may comprise a main content section 202 and an associated content section 204. User interface 200 may be displayed on display device 110, for example. Although associated content section 204 is illustrated as having one section or window, this is not meant to limit the invention. As mentioned above, a content association rule may have a main content source and one or more associated content sources. In embodiments, associated content section 204 may include a number of windows equal to the number of associated content sources as defined in a particular association rule. As mentioned previously, an association rule may include multiple associated content sources and the user may customize the association rule to display all of the multiple associated content sources at the same time. Here, section 204 would include an equal number of windows to the number of associated content sources. On the other hand, if the user customizes the association rule to toggle through the associated content sources one by one, then section 204 may only display one window. Each of these sections is described next in more detail.

In embodiments, main content section 202 displays the primary or main content that is being watched by a user (e.g., defined as the main content source in the association rule). The main content may be broadcasted, received via cable or satellite feeds, pre-recorded and stored on a digital recording device (such as a PVR or DVR), streamed or downloaded via the Internet via an IP connection, stored on a home local area network (LAN), received via various types of video interconnects (e.g., Video Graphics Array (VGA), High-Definition Multimedia Interface (HDMI), component video, composite video, etc.), and so forth. Connections or inputs may also include via DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. In embodiments, the content being displayed in section 202 cannot be altered by the user. The content displayed in section 202 may include shows or programs, graphics, video games, books, video shorts, video previews, news clips, news highlights, and so forth. Related voice, audio, music, etc., may also be presented with the displayed content in section 202.

In embodiments, content displayed in associated content section 204 may represent the associated content source as defined in the association rule. In embodiments, content displayed in section 204 may be any content or information or graphics (e.g., audio, video or graphics signal) that is overlayed or blended with another content or information or graphics (e.g., audio, video or graphics signal). In embodiments, the content may be streamed or downloaded to connected device 108 from the Internet via an IP connection (for example, via content server 102 and network connection 104 from FIG. 1), via a P2P connection (such as input 120), via broadcast/satellite/cable (such as input 122), DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. In other embodiments, the content may be content received via any USB device connection (such as from devices 114). This contact may be content that is dynamic or constantly updated via an IP delivered site, system or service or via a USB device, for example. User interface 200 may be displayed on a display device (such as display device 110). A television may be an example display device. Other examples may include, but are not limited to, a mobile Internet device (MID) that has a screen that displays video, a cell phone, a PC, laptop, or any other device that is adapted to facilitate embodiments of the invention.

In embodiments, connected device 108 allows the user to customize the display of the associated sources of content via content customization engine 118 and customization rules. Thus, each association rule may have one or more customization rules associated with it.

For example, in embodiments, the main content source may be displayed in main content section 202 of the display screen, where main content section 202 includes the entire screen. The associated content source may be displayed in an associated content section, where the associated content section is overlayed in some way over the main content section on the screen. Embodiments of the invention allow the user to customize the display of the main and associated content sections (e.g., placement on screen, size, volume level of audio associated with content, quality (e.g., opaque or transparent), audio only, visual only, and so forth). Embodiments of the invention are not limited in this context.

Referring again to FIG. 2, user interface 200 illustrates one display format where section 204 is smaller in size than main content section 202 and positioned on the lower area of user interface 200. Embodiments of the invention are not limited to the display format illustrated in FIG. 2. In fact, embodiments of the invention allow the user to customize the content displayed in section 204 and to customize the position and size of section 204 in user interface 200. Here, the user may download a program element to a connected device (such as connected device 108 from FIG. 1) from an IP delivered site or service or from a USB device (for example) that allows the user to customize section 204 to reflect user preferences. The customization of section 204 may include the number of windows, the content displayed in each of its windows, and the size and location of section 204 on user interface 200. In embodiments, the user may elect to watch what is being displayed in one of the windows of section 204. Here, the window may be expanded to include all of user interface 200.

In embodiments, the user may use connected device 108 to overlay or blend the multiple input content with main content on the single display device without altering the main content. In embodiments, the main content may be decoded and then re-encoded with the associate content. In embodiments, the overlay or blending of the associated content and main content may be a hardware-enabled overlay or blend via a microprocessor, chipset, graphics card, etc. In other embodiments, the overlay or blending of the associated content and main content may be a software-enabled overlay or blend via a specific application, operating system, etc. In yet other embodiments, the overlay or blending may be via a combination of hardware and/or software components. In addition, there may be some overlay or blending in the pipes themselves or via another method while the content is in route to the screen. This may be implemented with wireless connection technology, wired connection technology, or a combination of both. The user may customize or configure user interface 200 directly on connected device 108 or via a user input device such as a remote control or PC, for example.

Embodiments of the invention also allow for the user to define customization rules that involve triggers upon defined events. One example may include when main content section 202 starts to display a commercial then enlarge associated content section 204 on the screen and increase the volume level for its associated audio (and decrease the volume for the main content). Once the commercials are over, then decrease associated content section 204 to normal size and adjust the volumes accordingly. Embodiments of the invention are not limited in this context. Other embodiments may be described and claimed.

As described above, embodiments of the invention provide for content association rules that are created, stored and automatically launched for the user when the user views or accesses the main content source without any further interaction from the user. In embodiments, when the user causes the display of the main content source, the associated content source is automatically displayed or accessible with the main content source on the same display device. For example, when the user causes the display of a main content source as is defined in an association rule for the user, the display of the associated content source (as defined in the same association rule) is automatically overlayed in some manner on top of the main content source. As the user switches between main content sources (as defined in different association rules), then the associated content sources are also switched. An example of this is illustrated in FIG. 3.

Figure 3:
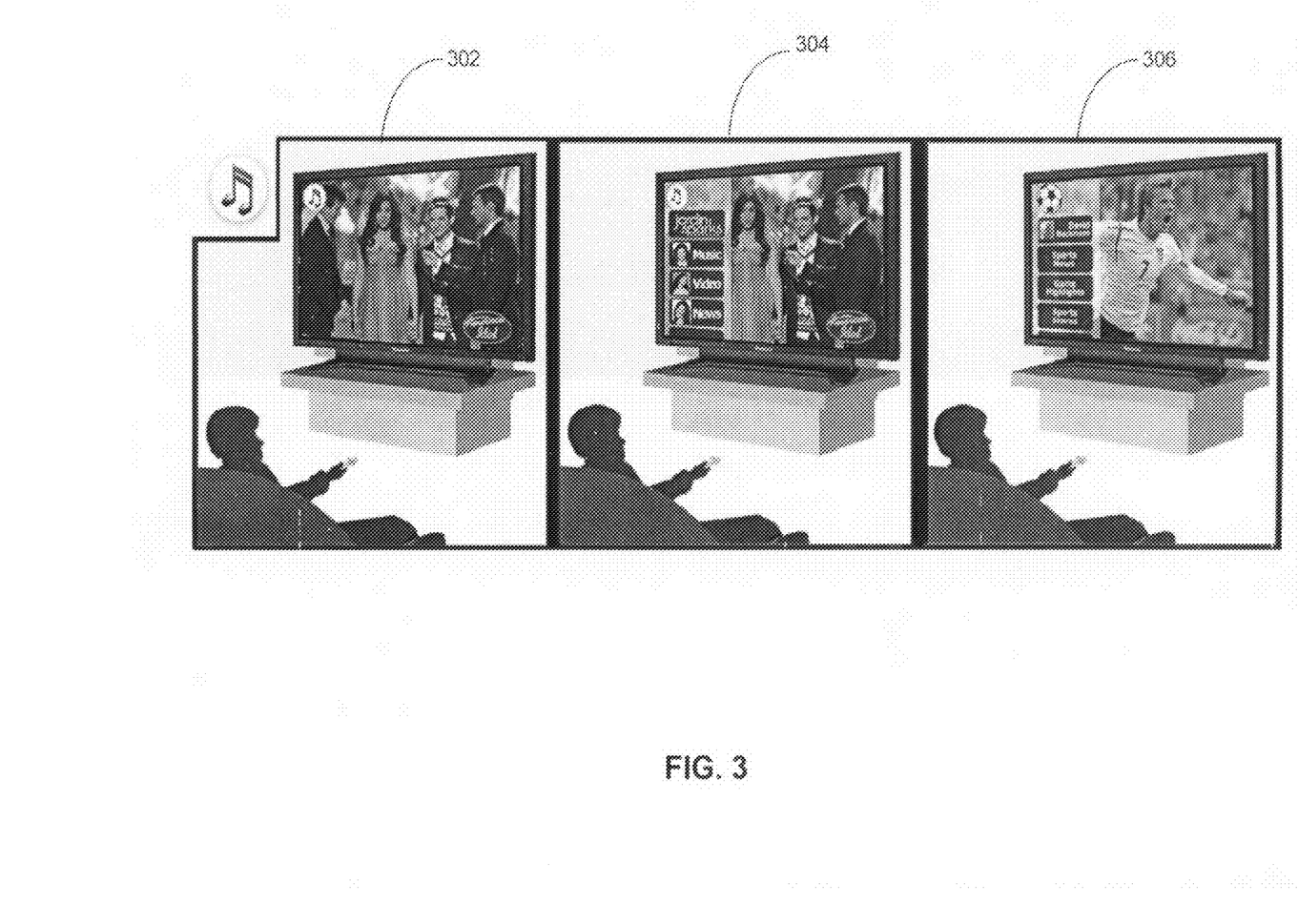
FIG. 3 illustrates one embodiment of a user interface.

Referred to FIG. 3, the person interacting with user interface 302 has just tuned to the American Idol show. Using the example above, assume that an association rule is automatically executed for the user that has the American Idol show as the main content source and an Internet blogger about the American Idol show as the associated content source. This is illustrated in user interface 304. Now, the user switches the main content source to a soccer game. Assume that a different association rule is automatically executed that replaces the associated content source with relevant content to the soccer game, as illustrated in user interface 306. Of course, when the user tunes back to the American Idol show, then the associated content switches back to the American Idol blogger. The embodiments of the invention are not limited in this context.

Referring back to FIG. 1, user environment 106 may also include display device 110 and user input device 112. Display device 110 may be a monitor, projector, a conventional analog television receiver, a MID, cell phone, PC, laptop, or any other kind of device with a perceivable video display. The audio portion of the output of the connected devices may be routed through an amplifier, such as an audio/video (A/V) receiver or a sound processing engine, to headphones, speakers or any other type of sound generation device. User input device 112 may be any type of input device suited for a user to communicate with connected device 108.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 4:
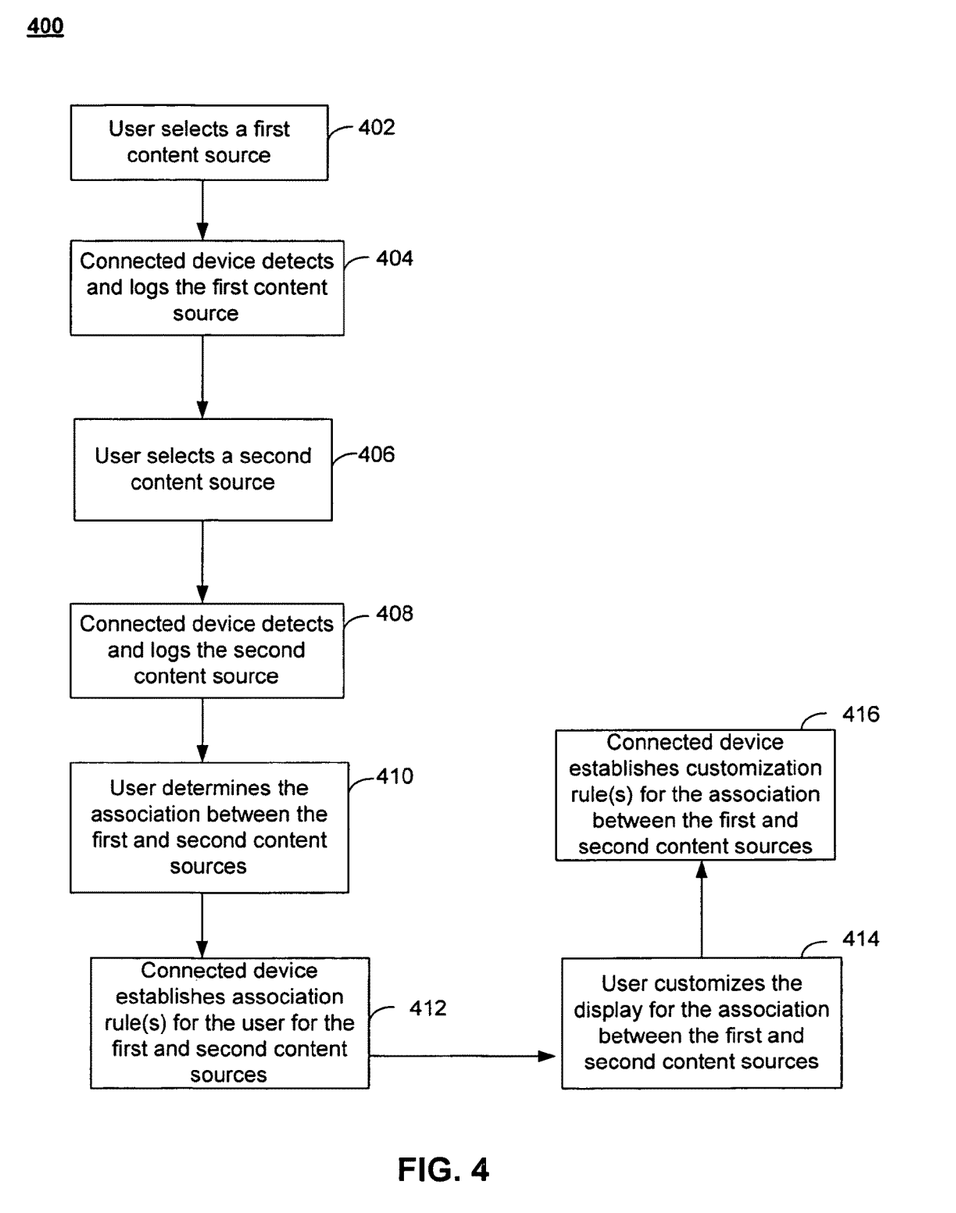
FIG. 4 illustrates one embodiment of a logic flow.

FIG. 4 illustrates one embodiment of a logic flow 400. As shown in logic flow 400, a user selects a first content source via a connected device (such as connected device 108 from FIG. 1) (block 402). The connected device detects and logs the first content source (block 404). The user then selects a second content source (block 406). The connected device detects and logs the second content source (408). As described above, the user is not limited to selecting two content sources.

The user then determines the association between the selected first and second content sources (block 410). As described above, in embodiments, a default association rule may establish that the first selected content source is the main content source and any other selected content source(s) are the associated content sources. Alternately, the association rule may be defined by the user (e.g., the second selected content source is the main content source). In embodiments, the user may also further define the content sources by indicating particular content in which he or she is only interested (e.g., information for a particular contestant on the American Idol show).

The connected device then establishes association rule(s) for the user for the first and second content sources, as described above (block 412). The user may also customize the display of the content sources represented in the established association rule, as described above (block 414). Here, the connected device establishes customization rule(s) for the established association rule (block 416).

Figure 5:
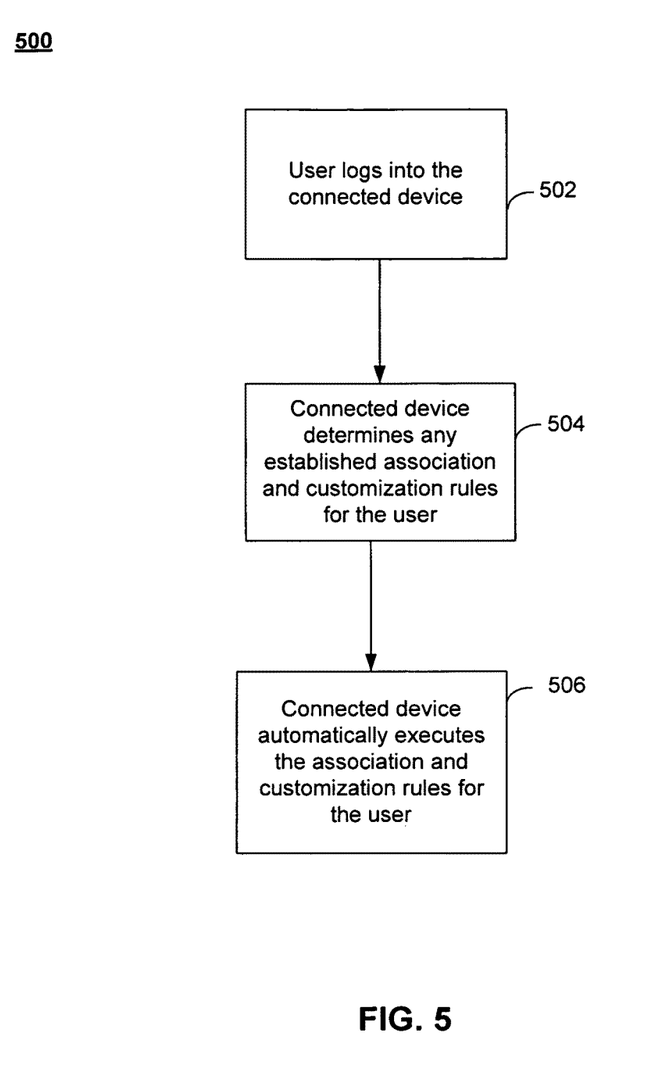
FIG. 5 illustrates one embodiment of a logic flow.

FIG. 5 illustrates one embodiment of a logic flow 500. Referring to FIG. 5, the user logs into and is identified by the connected device (block 502). In embodiments, the user may identify himself or herself to the connected device via a typical login and password combination. The user may also be identified by the connected device via any other means, including but not limited to, various biometric data devices (e.g., fingerprint scan devices, retina scan devices, voice identification devices, etc.).

Once identified by the connected device, the device determines any established association and/or customization rules for the user (block 504). The connected device automatically executes the association and customization rules for the user, as described above (block 506).

Figure 6:
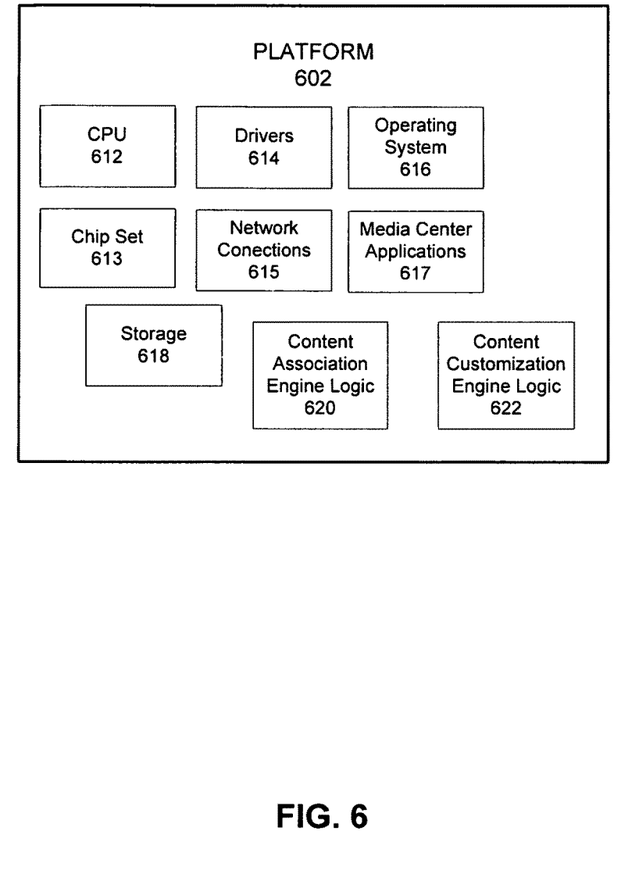
FIG. 6 illustrates one embodiment of a system.

FIG. 6 illustrates an embodiment of a platform 602 (e.g., connected device 108 from FIG. 1). In one embodiment, platform 602 may comprise or may be implemented as a media platform 602 such as the Viiv™ media platform made by Intel® Corporation. In one embodiment, platform 602 may interact with content servers (such as servers 102 via network connection 104 from FIG. 1).

In one embodiment, platform 602 may comprise a CPU 612, a chip set 613, one or more drivers 614, one or more network connections 615, an operating system 616, and/or one or more media center applications 617 comprising one or more software applications, for example. Platform 602 also may comprise storage 618, content association engine logic 620 and content customization engine logic 622.

In one embodiment, CPU 612 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 613 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 614 may comprise the Quick Resume Technology Drivers made by Intel® to enable users to instantly turn on and off platform 602 like a television with the touch of a button after initial boot-up, when enabled, for example. In addition, chip set 613 may comprise hardware and/or software support for 5.1 surround sound audio and/or high definition 7.1 surround sound audio, for example. Drivers 614 may include a graphics driver for integrated graphics platforms. In one embodiment, the graphics driver may comprise a peripheral component interconnect (PCI) Express graphics card.

In one embodiment, network connections 615 may comprise the PRO/1000 PM or PRO/100 VE/VM network connection, both made by Intel® Corporation.

In one embodiment, operating system 616 may comprise the Windows® XP Media Center made by Microsoft® Corporation. In other embodiments, operating system 616 may comprise Linux®, as well as other types of operating systems. In one embodiment, one or more media center applications 617 may comprise a media shell to enable users to interact with a remote control device from a distance of about 10-feet away from platform 602 or a display device, for example. In one embodiment, the media shell may be referred to as a "10-feet user interface," for example. In addition, one or more media center applications 617 may comprise the Quick Resume Technology made by Intel®, which allows instant on/off functionality and may allow platform 602 to stream content to media adaptors when the platform is turned "off."

In one embodiment, storage 618 may comprise the Matrix Storage technology made by Intel® to increase the storage performance enhanced protection for valuable digital media when multiple hard drives are included. In one embodiment, content association engine logic 620 and content customization engine logic 622 are used to enable the functionality of the invention as described herein. The embodiments, however, are not limited to the elements or in the context shown or described in FIG. 6.

Platform 610 may establish one or more logical or physical channels to communicate information. The information may include media information and control information. Media information may refer to any data representing content meant for a user. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
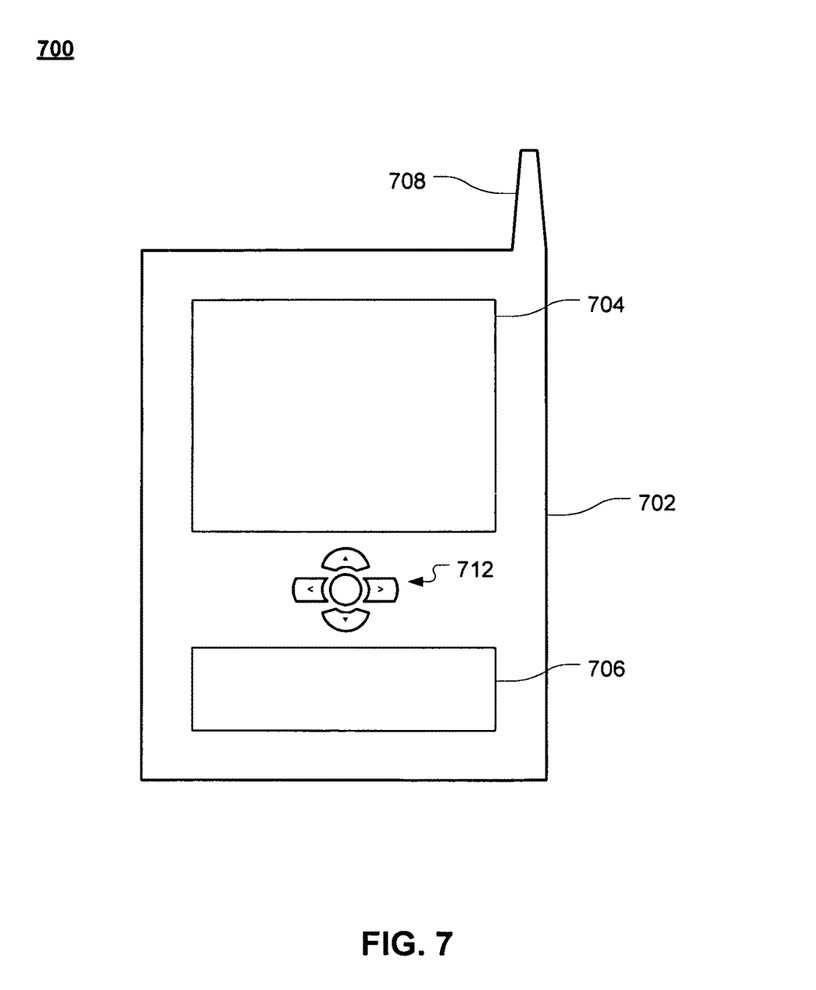
FIG. 7 illustrates one embodiment of a device.

FIG. 7 illustrates one embodiment of a device 700 in which functionality of the present invention as described herein may be implemented. In one embodiment, for example, device 700 may comprise a communication system. In various embodiments, device 700 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In one embodiment, device 700 may be implemented as part of a wired communication system, a wireless communication system, or a combination of both. In one embodiment, for example, device 700 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise a five-way navigation button 712. I/O device 706 may comprise a suitable keyboard, a microphone, and/or a speaker, for example. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
a connected device, comprising a processor coupled to a memory, connected to multiple content sources,
when the user accesses one content source, the connected device is to automatically receive content from the one content source and associated content from at least one associated content source,
wherein the connected device is to cause the display of the associated content overlaid on the one main content via a user interface on a display device, and
the connected device is adapted to cause the display of the associated content to be enlarged and an audio level of said associated content to be increased based on occurrence of a commercial provided by the main content source.

2. The system of claim 1, wherein the display device is one of a television, mobile Internet device (MID), cell phone, personal computer (PC) and a laptop computer.

3. The system of claim 1, wherein the user interface comprises an associated content section to display the associated content and a main content section to display the one content.

4. The system of claim 3, wherein the associated content section is to be divided into a number of windows equal to a number of the at least one associated content source.

5. The system of claim 1, wherein the connected device is to store a customization rule for an association rule defined by a user, wherein the association rule defines the one content source and at least one associated content source, and wherein the customization rule is automatically executed with the association rule.

6. The system of claim 5, wherein the customization rule comprises at least one of a display customization and a trigger customization.

7. A computer implemented method, comprising:
when the user accesses the main content source, automatically receiving main content from the main content source and associated content from the at least one associated content source;
causing the display of the associated content overlaid on the main content via a user interface on a display device; and
enlarging the display of the associated content and increasing an audio level of said associated content based on the occurrence of a commercial provided by the main content source.

8. The method of claim 7, wherein the display device is one of a television, mobile Internet device (MID), cell phone, personal computer (PC) and a laptop computer.

9. The method of claim 7, wherein the user interface comprises an associated content section to display the associated content and a main content section to display the main content.

10. The method of claim 9, wherein the associated content section comprises a number of windows equal to a number of the at least one associated content source.

11. The method of claim 7, further comprising:
storing a customization rule for an association rule defined by a user, wherein the association rule defines the one content source and at least one associated content source; and
automatically executing the customization rule with the association rule.

12. The method of claim 11, wherein the customization rule comprises at least one of a display customization and a trigger customization.

13. A tangible machine-readable storage medium containing instructions which, when executed by a processing system, cause the processing system to perform a method, the method comprising:
when the user accesses the main content source, automatically receiving main content from the main content source and associated content from the at least one associated content source;
causing the display of the associated content to be overlaid on the main content via a user interface on a display device; and
enlarging the display of the associated content and increasing an audio level of said associated content based on the occurrence of a commercial provided by the main content source.

14. The machine-readable storage medium of claim 13, wherein the display device is a television, mobile Internet device (MID), cell phone, personal computer (PC) and a laptop computer.

15. The machine-readable storage medium of claim 13, wherein the user interface comprises an associated content section to display the associated content and a main content section to display the main content.

16. The machine-readable storage medium of claim 15, wherein the associated content section comprises a number of windows equal to a number of the at least one associated content source.

17. The machine-readable storage medium of claim 13, further comprising:
storing a customization rule for an association rule defined by a user, wherein the association rule defines the one content source and at least one associated content source; and
automatically executing the customization rule with the association rule, wherein the customization rule comprises at least one of a display customization and a trigger customization.

* * * * *